United States Patent
Toda et al.

(10) Patent No.: US 7,544,320 B2
(45) Date of Patent: Jun. 9, 2009

(54) METHOD OF MANUFACTURING POROUS CERAMIC BODY

(75) Inventors: Yumi Toda, Neyagawa (JP); Yoshinori Yamamoto, Nishikamo-gun (JP); Yukihisa Wada, Nishin (JP)

(73) Assignee: NGK Insulators, Ltd., Nagoya (JP)

( * ) Notice: Subject to any disclaimer, the term of this patent is extended or adjusted under 35 U.S.C. 154(b) by 625 days.

(21) Appl. No.: 10/522,011

(22) PCT Filed: Jul. 9, 2003

(86) PCT No.: PCT/JP03/08712

§ 371 (c)(1),
(2), (4) Date: Apr. 5, 2005

(87) PCT Pub. No.: WO2004/011390

PCT Pub. Date: Feb. 5, 2004

(65) Prior Publication Data

US 2005/0242455 A1  Nov. 3, 2005

(30) Foreign Application Priority Data

Jul. 26, 2002  (JP) ............................. 2002-217941

(51) Int. Cl.
*B29C 65/00*  (2006.01)
(52) U.S. Cl. .................................. 264/653; 264/677
(58) Field of Classification Search ............... 264/653, 264/677
See application file for complete search history.

(56) References Cited

U.S. PATENT DOCUMENTS 5,183,609 A   2/1993  Miyahara
6,287,510 B1 *  9/2001  Xun ........................... 264/630

FOREIGN PATENT DOCUMENTS

| EP | 0 335 735 A2 | 10/1989 |
| EP | 0 357 789 | 3/1990 |
| JP | A 57-119843 | 7/1982 |
| JP | A-1-203273 | 8/1989 |
| JP | A 10-273366 | 11/1998 |
| JP | A 2001-316190 | 11/2001 |
| WO | WO 99/28268 A1 | 6/1999 |
| WO | WO 99/28269 A1 | 6/1999 |
| WO | WO 99/28689 A1 | 6/1999 |
| WO | WO 99/32844 A1 | 7/1999 |

* cited by examiner

*Primary Examiner*—Carlos Lopez
(74) *Attorney, Agent, or Firm*—Oliff & Berridge, PLC

(57) ABSTRACT

There is disclosed a method of manufacturing a porous ceramic structure, comprising the steps of: preparing a formed structure using a ceramic material containing a pore former and a binder; and drying and firing the formed structure, wherein the process of firing the formed structure comprises the steps of: holding a firing atmosphere temperature in a temperature range of −50 to +10° C. with respect to a combustion start temperature of the binder from the time when the temperature reaches the combustion start temperature of the binder contained in the porous ceramic structure to be fired to the time when the binder is burnt out. According to this method, ceramic structures having not only a low porosity but also a high porosity can be manufactured without generating any crack during the firing.

5 Claims, 5 Drawing Sheets

METHOD OF MANUFACTURING POROUS CERAMIC BODY

TECHNICAL FIELD

The present invention relates to a method of manufacturing a porous ceramic structure. The present invention more particularly relates to a method of manufacturing a porous ceramic article, in which a temperature rise speed of a firing atmosphere at a firing time is controlled to inhibit generation of cracks or the like. It is to be noted that the manufacturing method of the present invention is applicable to the manufacturing of various types of porous ceramic structures, and is particularly preferable for manufacturing a porous ceramic honeycomb structure having high porosity in which a temperature rise inside a formed structure by combustion of a pore former is remarkable at the time of the firing of the formed structure.

BACKGROUND ART

A porous ceramic honeycomb structure has been broadly used as exhaust gas purification means or the like, and as a method of manufacturing the porous ceramic honeycomb structure, a method is performed in which a formed structure is prepared using a ceramic material to which a binder, a pore former or the like has been added, and the formed structure is dried and fired. In this case, it is general to raise the temperature at a constant speed in a firing atmosphere in a firing step. As the binder, organic binders such as methyl cellulose and hydroxypropyl methyl cellulose are used, because formability is satisfactory. Furthermore, as the pore former, various pore formers are used for purposes. A pore former which burns at low temperature, such as starch, has an advantage that it is burnt out in an early stage of the firing step. Therefore, a manufacturing method in which the firing atmosphere is switched to an inert gas from atmospheric air in an early stage at low firing atmosphere temperature has been frequently used because the formed structure needs to be fired in an inert gas atmosphere as in the method of manufacturing a ceramic structure formed of SiC or the like. Even in a manufacturing method in which the formed structure is fired in the atmospheric air as in a method of manufacturing a ceramic structure formed of cordierite or the like, a pore former which burns at a low temperature, such as starch, is used together with a pore former which burns at a high temperature, such as carbon, in order to increase porosity.

Additionally, in recent years, the enhancement of the porosity has advanced from demands for reduction of pressure loss, enhancement of collection efficiency or the like, and a porosity of 40% or more has been a mainstream in the porous ceramic honeycomb structure for use as exhaust gas purification means. Therefore, an addition amount of the pore former, for example, starch or the like tends to increase year by year. In recent years, it has been a mainstream that the ceramic material contains about 20% by mass of the pore former.

However, the addition of a large amount of pore former causes a new problem in the conventional method of manufacturing the porous ceramic honeycomb structure, that is, a problem that cracks are generated in an obtained ceramic structure for an unknown cause, when the formed structure containing a large amount of pore former for obtaining the high porosity is fired in a temperature raising program similar to a conventional program. This has been a large trouble in manufacturing a ceramic structure having high porosity.

The present invention has been developed in consideration of the above-described problem, and an object thereof is to provide a method of manufacturing a porous ceramic structure, which is capable of manufacturing ceramic structures having not only a low porosity but also a high porosity without generating any crack during the firing.

DISCLOSURE OF THE INVENTION

As a result of intensive researches to solve the above-described problems, the present inventor has first found that a remarkable temperature rise estranged from a firing atmosphere temperature is recognized inside a formed structure, and a large temperature difference from the vicinity of the outer surface of the formed structure is made, when the firing temperature reaches a combustion start temperature of a binder in a honeycomb structure in which cracks are generated. As a result of inspection and research of causes, it has been seen that a temperature rise by combustion of an organic binder causes chain combustion of a pore former having a low combustion start temperature, such as starch, and simultaneous combustion of the organic binder and the pore former causes a remarkable temperature rise in a ceramic structure which easily accumulates heat in a firing step in which a firing atmosphere temperature is linearly raised. Then, as a result of intensive studies to stop the chain combustion of the organic binder and the pore former, the present inventor has found that the above-mentioned problem can be solved by holding the firing atmosphere temperature at a temperature in the vicinity of the combustion start temperature of the binder from the time when the temperature reaches the combustion start temperature of the binder to the time when the binder is burnt out.

That is, according to the present invention, there is provided a method of manufacturing a porous ceramic structure, comprising the steps of: preparing a formed structure using a ceramic material containing a pore former and a binder; and drying and firing the formed structure, wherein the process of firing the formed structure comprises the steps of: holding a firing atmosphere temperature in a temperature range of −50 to +10° C. with respect to a combustion start temperature of the binder from time when the temperature reaches the combustion start temperature of the binder to time when the binder is burnt out.

In the present invention, the process of firing the formed structure more preferably comprises the steps of: holding the firing atmosphere temperature in a temperature range of −50 to +10° C. with respect to the combustion start temperature of the binder from the time when the temperature reaches a temperature lower than the combustion start temperature of the binder by 50° C. to the time when the binder is burnt out.

Moreover, the binder for use in the present invention preferably comprises at least one type selected from a group consisting of hydroxypropyl methyl cellulose, methyl cellulose, hydroxyethyl cellulose, carboxyl methyl cellulose,-and polyvinyl alcohol.

Furthermore, the pore former for use in the present invention preferably comprises at least one type selected from a group consisting of flour, starch, phenol resin, foam resin, foamed foam resin, polymethyl methacrylate, and polyethylene terephthalate.

The manufacturing method of the present invention is preferably applied to the manufacturing of a honeycomb structure among the porous ceramic structures.

BEST MODE FOR CARRYING OUT THE INVENTION

First, a basic principle of a firing step in a manufacturing method of the present invention will be described with reference to FIGS. 1 and 2.

Figure 1:
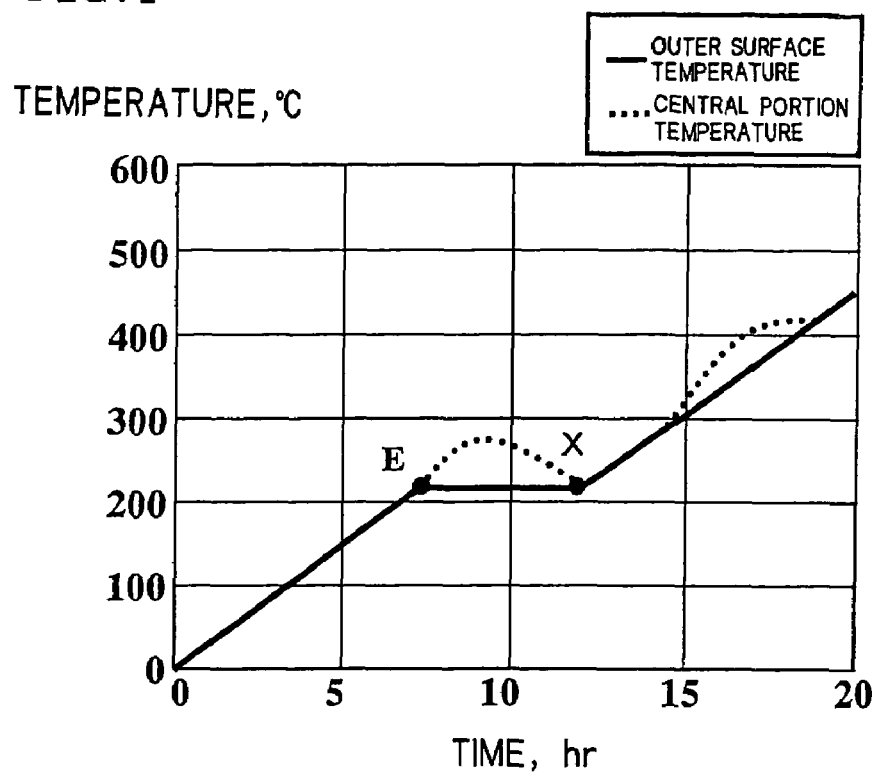
FIG. 1 is a graph showing a temperature of a central portion of a formed structure, and a temperature (firing atmosphere temperature) of an outer peripheral portion of the formed structure in a firing step of the present invention in which firing atmosphere is held from the time when firing atmosphere reaches a combustion start temperature of a binder to the time when the binder is completely burnt out.
Figure 2:
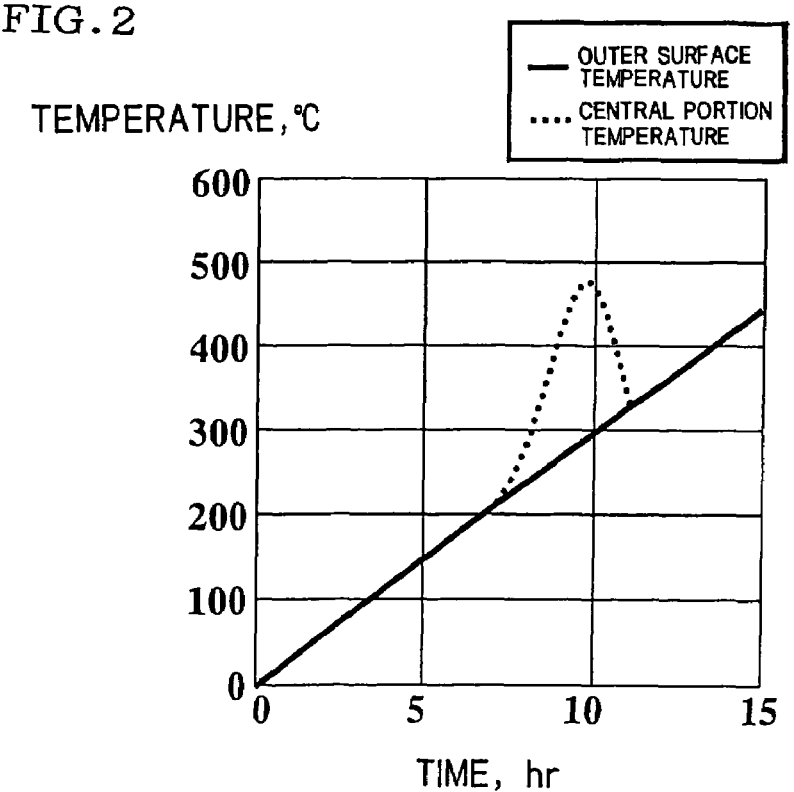
FIG. 2 is a graph showing the temperature of the central portion of the formed structure, and the temperature (firing atmosphere temperature) of the outer peripheral portion in a conventional firing step in which the temperature of the firing atmosphere is raised at a certain speed.

FIG. 2 is a graph showing temperature changes of an outer surface and a central portion of a formed structure in a case where the formed structure containing a pore former (starch) and binder (hydroxypropyl methyl cellulose) is fired according to a firing program for raising a firing temperature at a constant speed. On the other hand, FIG. 1 is a graph showing the temperature changes of the outer surface and the central portion of the formed structure in a case where the formed structure containing a pore former (starch) and binder (hydroxypropyl methyl cellulose) is fired according to a firing program wherein the firing atmosphere temperature is held at the combustion start temperature of the binder from the time when the firing atmosphere temperature reaches a combustion start temperature (220° C.) of the binder (hydroxypropyl methyl cellulose) to the time when the binder (hydroxypropyl methyl cellulose) is burnt out. It is to be noted that in the respective figures, a dotted line indicates the temperature of the formed structure central portion, and a solid line shows the temperature of its outer surface and the firing atmosphere temperature.

First, as shown in FIG. 2, in a case where the formed structure is fired by the firing program wherein the firing temperature is raised at the constant speed, when the firing atmosphere temperature reaches 220° C. which is the combustion start temperature of the binder (hydroxypropyl methyl cellulose), an inner temperature of the formed structure starts to be estranged from the outer surface temperature of the same formed structure. Moreover, the inner temperature of the formed structure changes at a level higher than the temperature of its outer surface. When the temperature reaches the combustion start temperature of the pore former (starch) at 290° C. in a short time, the inner temperature of the formed structure further rapidly rises, and becomes higher than the outer surface temperature of the formed structure by about 150° C. at a peak time. As a result, large heat contraction amplitude occurs between the inner portion and the outer peripheral portion of the formed structure, and damages such as cracks are generated in a resulting ceramic structure. It is to be noted that thereafter the inner temperature of the formed structure rapidly converges at a temperature equal to the outer surface temperature of the formed structure, and then changes substantially in the same manner as in the outer surface temperature due to burning out of all the pore former.

Next, as shown in FIG. 1, the case where the formed structure is fired by the firing program wherein the firing atmosphere temperature is held at the combustion start temperature (220° C.) of the binder (hydroxypropyl methyl cellulose) from the time when the firing atmosphere temperature reaches the combustion start temperature (220° C.) of the binder (hydroxypropyl methyl cellulose) to the time when the binder is burnt out will be described. First, the firing by this firing program is similar to the firing of the formed structure according to the above-described firing program wherein the firing temperature is raised at the constant speed in that the inner temperature of the formed structure starts to keep away from the outer surface temperature, when the firing atmosphere temperature reaches the combustion start temperature of the binder (hydroxypropyl methyl cellulose) at 200° C.

However, as a result of the holding the firing atmosphere temperature at the combustion start temperature (220° C.) of the binder (hydroxypropyl methyl cellulose) from the time when the firing atmosphere temperature reaches the combustion start temperature (220° C.) of the binder (hydroxypropyl methyl cellulose) in five hours after starting the firing to the time when the binder (hydroxypropyl methyl cellulose) is completely burnt out in ten hours after starting the firing, the estrangement of the formed structure inner temperature from the outer surface temperature by the combustion of the binder is 50° C. at maximum. This is about ⅓ of the estrangement of the above-described example according to the conventional manufacturing method shown in FIG. 2. As a result, the heat contraction amplitude between the inner portion and the outer peripheral portion of the formed structure is reduced, and the generation of the cracks of the formed structure at the firing time is largely reduced. Needless to say, thereafter when the firing atmosphere temperature reaches the combustion start temperature of the pore former (starch) at 290° C. by raising the firing temperature again, the inner temperature of the formed structure is estranged from the outer surface temperature of the same formed structure again, and changes at a level higher than the outer surface temperature. However, since the binder is already burnt out at this time, the inner temperature of the formed structure is higher than the outer surface temperature by about 100° C. even at the peak time, and is about ⅔ of that in the above-described example by the conventional manufacturing method shown in FIG. 2. As a result, the heat contraction amplitude between the inner portion and the outer peripheral portion of the formed structure does not increase very much, and the generation of the cracks and the like of the formed structure at the firing time is largely reduced even in this stage. It is to be noted that thereafter the inner temperature of the formed structure converges at the temperature equal to the outer surface temperature of the formed structure, and changes substantially in the same manner as in the outer surface temperature, similar to the above-described example according to the conventional manufacturing method shown in FIG. 2.

The present invention has been explained by using the example in which hydroxypropyl methyl cellulose is used as the binder, starch is used as the pore former, and the firing atmosphere is held to be constant at the combustion start temperature. However, even when another binder or pore former is used, and the firing atmosphere is changed with holding the changed firing atmosphere for a certain period of time width with respect to the combustion start temperature, the basic principle is similar, and the present invention is not limited to the above description.

An embodiment of the present invention will be hereinafter concretely described in accordance with each step.

In the manufacturing method of the present invention, first a formed structure is prepared from a ceramic material containing a pore former, a binder and the like, and the formed structure is dried.

In the present invention, the ceramic material is not especially limited, and examples thereof include an SiC material, raw material convertible into, alumina, zirconium phosphate and the like.

Moreover, when the cordierite-forming raw material is used as the ceramic material, usually, silica ($SiO_2$) source components such as kaolin, talc, quartz, fused silica, and mullite, magnesia (MgO) source components such as talc and magnesite, and alumina ($Al_2O_3$) source components such as kaolin, aluminum oxide, and aluminum hydroxide are blended in such a manner as to obtain a theoretical composition of cordierite crystals. Additionally, one may use the raw materials whose theoretical composition is intentionally shifted, or the ones which contains mica, quartz, $Fe_2O_3$, CaO, $Na_2O$, $K_2O$ and the like as impurities, depending upon the application fields of the formed honeycomb structures. While the theoretical composition is maintained, the type or the blend ratio of constituting materials is controlled, or a particle diameter of various materials is controlled, and accordingly porosity and pore diameter of an obtained filter may be controlled.

Furthermore, when the SiC material is used as the ceramic material, usually SiC and metal Si may be blended in such a manner as to obtain the theoretical composition of Si bond SiC. While the theoretical composition is maintained, the type or the blend ratio of the constituting materials is controlled, or the particle diameter of various materials is controlled, and accordingly the porosity and pore diameter of the obtained filter may be controlled.

Additionally, examples of the pore formers for use in the present invention include carbon such as graphite or activated carbon, foamed resin such as acrylic microcapsule, foamable resin, flour, starch, phenol resin, polymethyl methacrylate, polyethylene, polyethylene terephthalate or the like. Additionally, the present invention is preferable in using the pore former which burns at a low temperature of 500° C. or less and which easily burns in a chain manner by the combustion of the organic binder, for example, flour, starch, phenol resin, foamable resin, foamed resin, polymethyl methacrylate, polyethylene terephthalate or the like. Needless to say, the present invention is preferable in a case where they are used together with carbon such as graphite or activated carbon.

In the present invention, a content of the pore former is not especially limited. For example, 1 to 20% by mass is preferably contained in case of polymethyl methacrylate, 1 to 10% by mass is preferably contained in case of polyethylene terephthalate, and 1 to 30% by mass is preferably contained in case of starch.

When each pore former is contained within this range, a ceramic structure having a desired high porosity can be obtained without generating forming defects and firing defects. It is to be noted that in the present invention, even when a large amount of pore former is contained in order to increase the porosity, any remarkable temperature rise inside the formed structure does not occur at the firing time, and a ceramic structure having high porosity can be manufactured without generating any crack or the like. This is because the simultaneous combustion of the binder and the pore former is suppressed as mentioned above.

Examples of the binder for use in the present invention include hydroxypropyl methyl cellulose, methyl cellulose, hydroxyethyl cellulose, carboxyl methyl cellulose, polyvinyl alcohol and the like.

In the present invention, the content of the binder is not especially limited. For example, 1 to 20% by mass is preferably contained in case of hydroxypropyl methyl cellulose, and 1 to 20% by mass is preferably contained in case of methyl cellulose. When each binder is contained within this range, a ceramic structure having a desired high porosity can be obtained without causing forming defects or firing defects.

In the present invention, another additive may be contained, if necessary. For example, a forming aid, a dispersing agent and the like may be contained.

Moreover, examples of the forming aid include stearic acid, oleic acid, laurate potash soap, ethylene glycol, trimethylene glycol and the like, and examples of the dispersing agent include dextrine, fatty acid soap, polyalcohol and the like.

It is to be noted that one type of these additives may be used alone or two or more types thereof may be used depending on purposes.

In the present invention, a method of preparing a formed structure is not especially limited, and an appropriately preferable method may be performed. For example, when a ceramic honeycomb structure for use as an exhaust gas purification filter is prepared, water is added to a ceramic material such as a cordierite-forming raw material or an SiC material, further the above-described pore former and binder, and the dispersing agent for use if necessary are added in desired amounts to prepare a raw material, and clay obtained by kneading thus prepared raw material may be formed to prepare the formed structure.

Moreover, examples of a method of forming the clay include an extrusion forming method, an injection forming method, a press forming method and the like. Above all, the extrusion forming method is preferably performed in that continuous forming is facilitated, and a ceramic crystal can be oriented to thereby obtain low thermal expansion.

Furthermore, examples of a method of drying the formed include hot air drying, microwave drying, dielectric drying, reduced-pressure drying, vacuum drying, freeze drying and the like, and an appropriate method is preferably selected in accordance with the ceramic material for use. It is to be noted that in the case of the formed structure containing the SiC material or the cordierite-forming raw material as a main component, a drying step of the hot air drying combined with one of the microwave drying and the dielectric drying is preferably performed in that the whole can be quickly and uniformly dried.

Next, in the manufacturing method of the present invention, the obtained formed structure is fired by a specified temperature raising program, that is, a temperature raising program in which the firing atmosphere temperature is held in a temperature range of $-50°$ C. to $+10°$ C. with respect to the combustion start temperature of the binder from the time when the firing atmosphere temperature reaches the combustion start temperature of the binder for use to the time when the binder is burnt out.

Accordingly, since the chain combustion of the binder and the pore former can be substantially suppressed, there is no occurrence of rapid temperature rise inside the ceramic structure, and a ceramic structure having high porosity can be obtained without generating any crack or the like by a firing contraction amplitude between formed structure portions.

Here, in the present description, as shown in FIG. 1, the "combustion start temperature" means a temperature E at which each binder generates heat while being oxidized, and the temperature starts to be estranged between the outer surface and the central portion of the honeycomb structure. Considering from only physical properties of the binder, the combustion start temperature is, for example, 220° C. in hydroxypropyl methyl cellulose, and 220° C. in methyl cellulose. However, since these binders are kneaded together with raw materials convertible into ceramic, and exist being contained in the formed structure, the combustion start temperature of the binder sometimes changes due to factors other than characteristics of the binders themselves.

Moreover, in the present description, as shown in FIG. 1, the "time at which the binder is burnt out" indicates a time X at which it can be presumed that the central portion temperature of the formed structure converges to the firing atmosphere temperature again after having estranged from the firing atmosphere temperature (outer surface temperature) due to the combustion start of the binder, and about 90% or more of the binder is burnt out.

It is natural that the time at which the binder is burnt out fluctuates on various conditions such as a type, particle diameter, content, holding temperature and the like of the binder, and is preferably held for a specified time from when the firing atmosphere temperature starts to be held in accordance with various conditions. Concretely, when the firing atmosphere temperature is halfway held at about 170 to 230° C., and the formed structure containing 1 to 10% by mass of methyl cellulose as the binder in all components is fired, the firing atmosphere temperature may be held for two hours or more, preferably three hours or more, further preferably four hours or more, especially preferably five hours or more after reaching about 220° C. (combustion start temperature of methyl cellulose). Similarly, when the firing atmosphere temperature is halfway held to be constant at 170 to 230° C., and the formed structure containing 1 to 10% by mass of hydroxypropyl methyl cellulose as the binder in all components is fired, the firing atmosphere temperature may be held for two hours or more, preferably three hours or more, further preferably four hours or more, especially preferably five hours or more after reaching about 220° C. (combustion start temperature of hydroxypropyl methyl cellulose).

Here, in the present description, to "hold" the firing atmosphere temperature, needless to say, includes a case where the temperature is held to be constant in a temperature range of $-50°$ C. to $+10°$ C. with respect to the combustion start temperature of the binder, and also includes a case where the temperature fluctuates within this temperature range.

Moreover, when two or more types of binders are used, a lower limit of the temperature range to hold the firing atmosphere temperature is determined on the basis of the combustion start temperature of the binder having a lowest combustion start temperature, and an upper limit thereof is determined on the basis of the combustion start temperature of the binder having a highest combustion start temperature.

Moreover, the firing atmosphere temperature in the present invention is more preferably in a temperature range of $-30$ to $0°$ C., especially preferably in a temperature range of $-20$ to $0°$ C. with respect to the combustion start temperature of the binder for use.

When the firing atmosphere temperature is set to this range, the chain combustion of the pore former caused by the combustion of the binder can be more completely suppressed.

In the present invention, the firing atmosphere temperature is further preferably held in a temperature range of $-50°$ C. to $+10°$ C. with respect to the combustion start temperature of the binder from the time when the firing atmosphere temperature reaches a temperature lower than the combustion start temperature by $50°$ C. to the time when the binder is burnt out.

When the firing atmosphere temperature is set to this range, de-binder can be realized also using decomposition reaction which does not involve heat generation before reaching the combustion start temperature, rapid rise of the formed structure inner temperature by the subsequent combustion phenomenon can be further reduced, and further the chain combustion of the pore former caused by the combustion of the binder can be more completely suppressed.

It is to be noted that even in a case where the firing atmosphere temperature is held in this manner from a time when reaching the temperature lower than the combustion start temperature, a temperature range of $-30$ to $0°$ C. is more preferable, and a temperature range of $-20$ to $0°$ C. is especially preferable with respect to the combustion start temperature of the binder for use in the same manner as in a case where the firing atmosphere temperature is held from when reaching the combustion start temperature.

As described above, the firing step in the present invention is not especially limited except that the firing atmosphere temperature is held in a specified temperature range for a specified time, and the firing atmosphere temperature may be raised outside the specified temperature range at a constant speed. Additionally, the temperature raising speed of the firing atmosphere is preferably set in a range in which the control is facilitated, and the temperature is preferably raised at a speed of 5 to 200° C./hr.

Moreover, the firing atmosphere is preferably filled with an appropriate gas in accordance with the ceramic material for use. For example, in a case where a ceramic material such as an SiC material that is burnt out in an aerobic state, the atmosphere is preferably replaced with Ar, $N_2$ or the like at a time when additives such as a binder and a pore former are burnt out. An atmospheric air may be used in the case of a raw material convertible into ceramic in the aerobic state, such as cordierite.

The method of manufacturing the porous ceramic structure in the present invention has been described above, and the manufacturing method is applicable to various porous ceramic structures regardless of a shape, size, structure and the like. Additionally, since the combustion of the pore former is promoted, the present invention is especially preferably applicable to the method of manufacturing the porous honeycomb structure having high porosity, in which a temperature difference between the firing atmosphere and the central portion easily increases.

The present invention will be more concretely described hereinafter by the examples, and the present invention is not limited to these examples. It is to be noted that the examples and comparative examples are evaluated as follows.

(Evaluation Method)

When honeycomb structures were prepared based on the examples and the comparative examples, temperatures of a central portion of a formed structure and a firing atmosphere were measured by R thermocouples to thereby obtain a difference between the temperatures. Presence of cracks was confirmed by the naked eye with respect to 100 honeycomb structures manufactured based on the examples and the comparative examples.

EXAMPLE 1

To 100 parts by mass of a raw material prepared using metal silicon (Me-Si) and SiC at a mass ratio of 20:80, 10 parts by mass of hydroxypropyl methyl cellulose which was a binder, 5 parts by mass of starch which was a pore former, further a surfactant and water were added, and a plastic clay was prepared.

Next, the clay was extruded, formed into a honeycomb shape, dried by microwaves, and thereafter absolutely dried by hot air drying.

Figure 3:
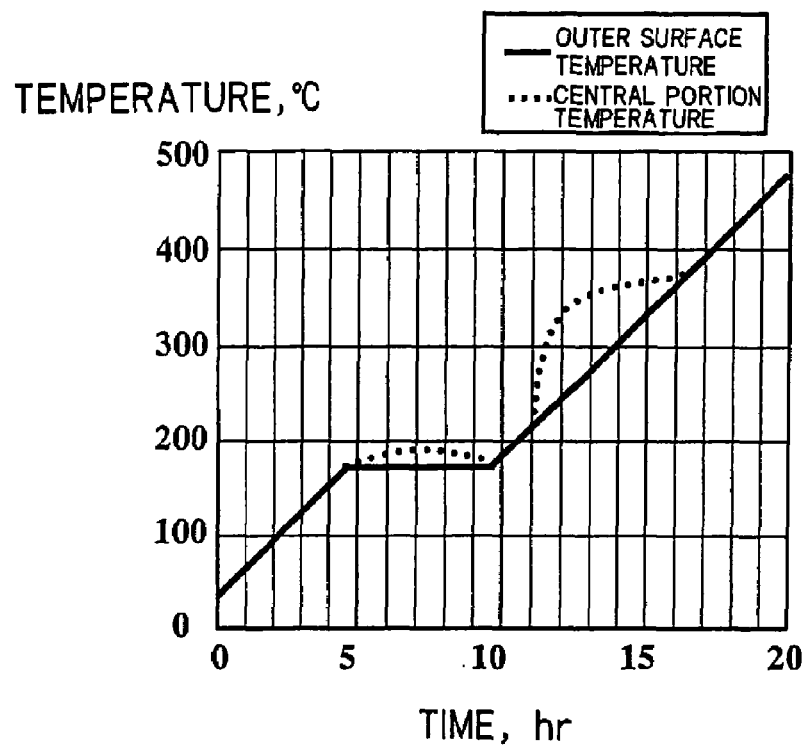
FIG. 3 is a graph showing the temperature of the central portion of the formed structure and the temperature (firing atmosphere temperature) of the outer peripheral portion of the formed structure in the firing step in Example 1.
Figure 4:
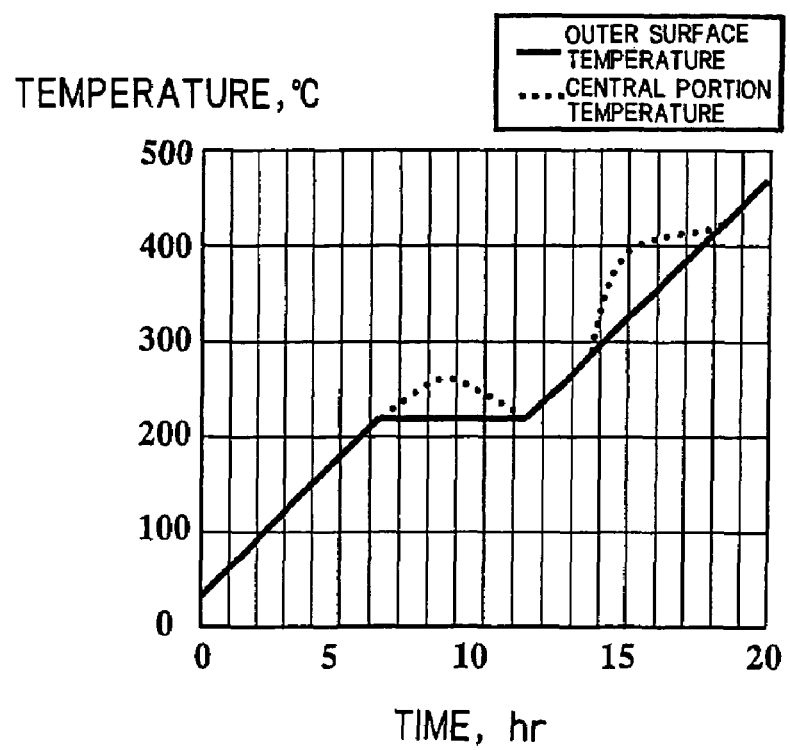
FIG. 4 is a graph showing the temperature of the central portion of the formed structure and the temperature (firing atmosphere temperature) of the outer peripheral portion of the formed structure in the firing step in Example 2.
Figure 5:
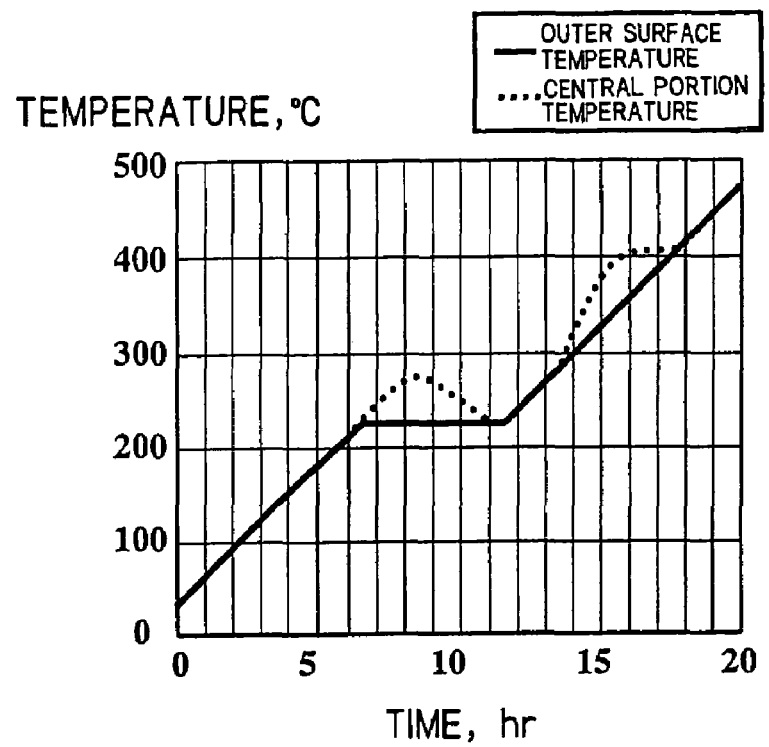
FIG. 5 is a graph showing the temperature of the central portion of the formed structure and the temperature (firing atmosphere temperature) of the outer peripheral portion of the formed structure in the firing step in Example 3.
Figure 6:
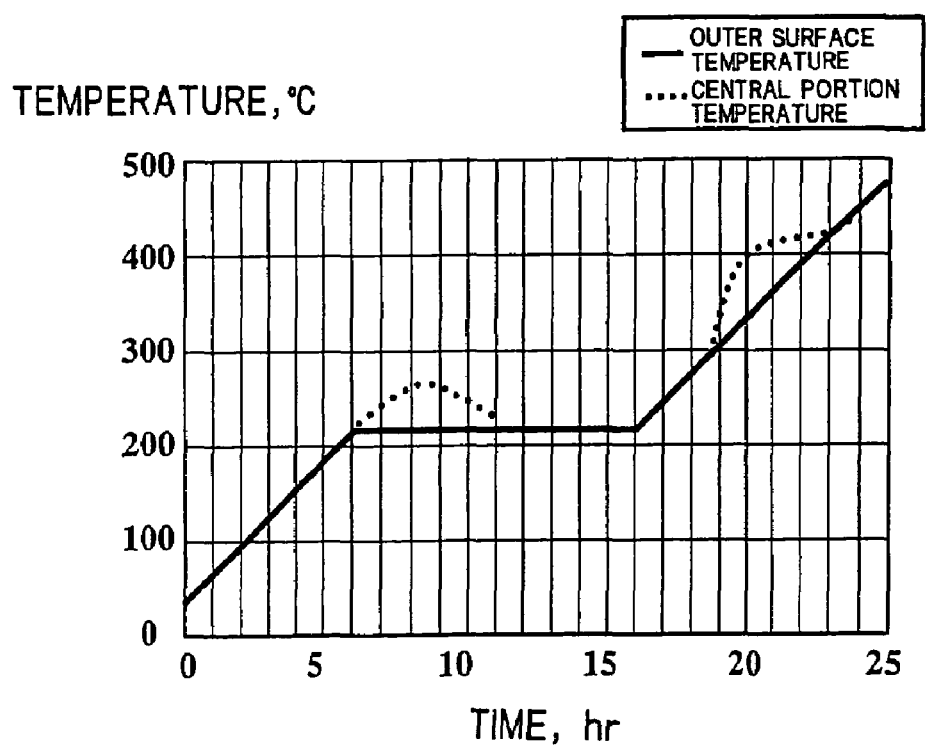
FIG. 6 is a graph showing the temperature of the central portion of the formed structure and the temperature (firing atmosphere temperature) of the outer peripheral portion of the formed structure in the firing step in Example 4.
Figure 7:
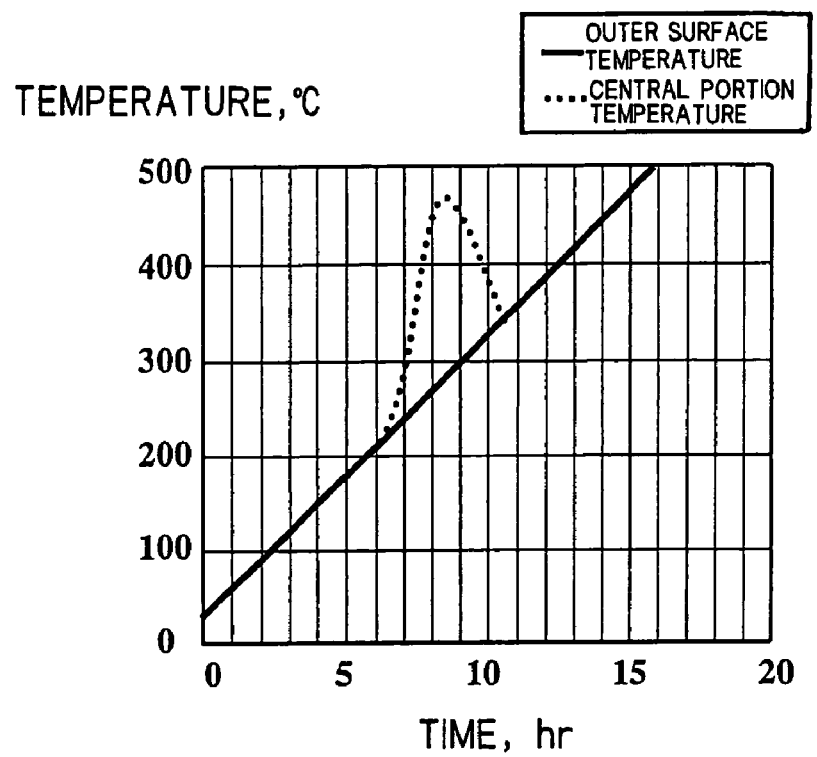
FIG. 7 is a graph showing the temperature of the central portion of the formed structure and the temperature (firing atmosphere temperature) of the outer peripheral portion of the formed structure in the firing step in Comparative Example 1.
Figure 8:
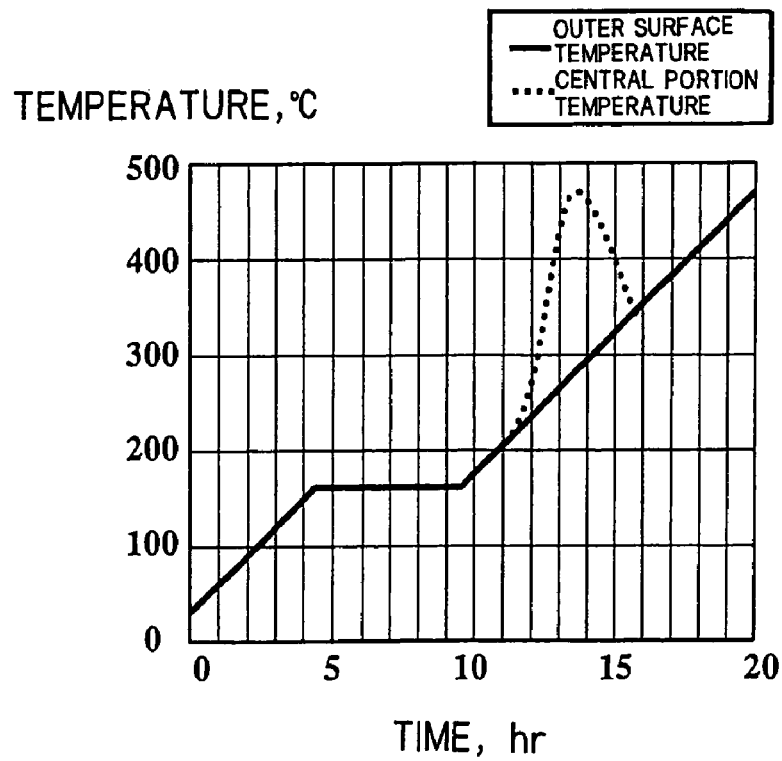
FIG. 8 is a graph showing the temperature of the central portion of the formed structure and the temperature (firing atmosphere temperature) of the outer peripheral portion of the formed structure in the firing step in Comparative Example 2.
Figure 9:
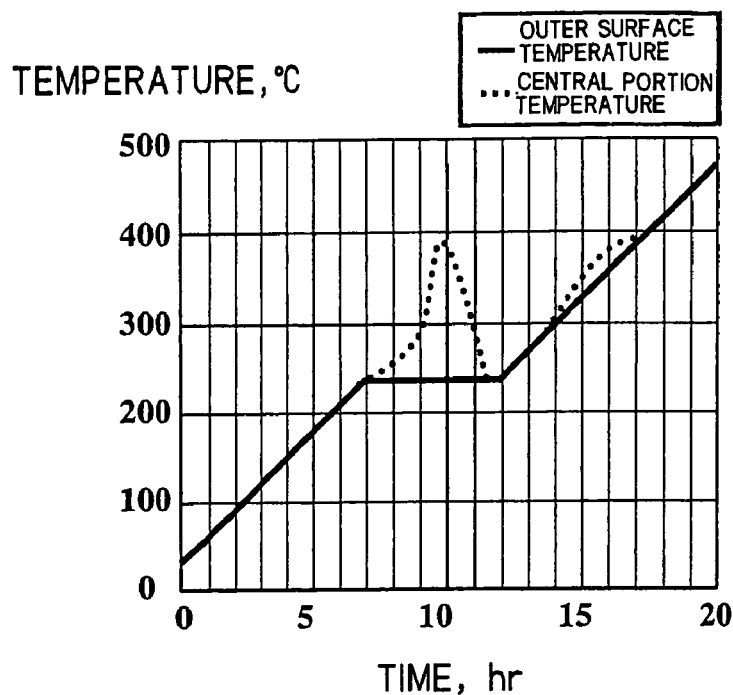
FIG. 9 is a graph showing the temperature of the central portion of the formed structure and the temperature (firing atmosphere temperature) of the outer peripheral portion of the formed structure in the firing step in Comparative Example 3.
Figure 10:
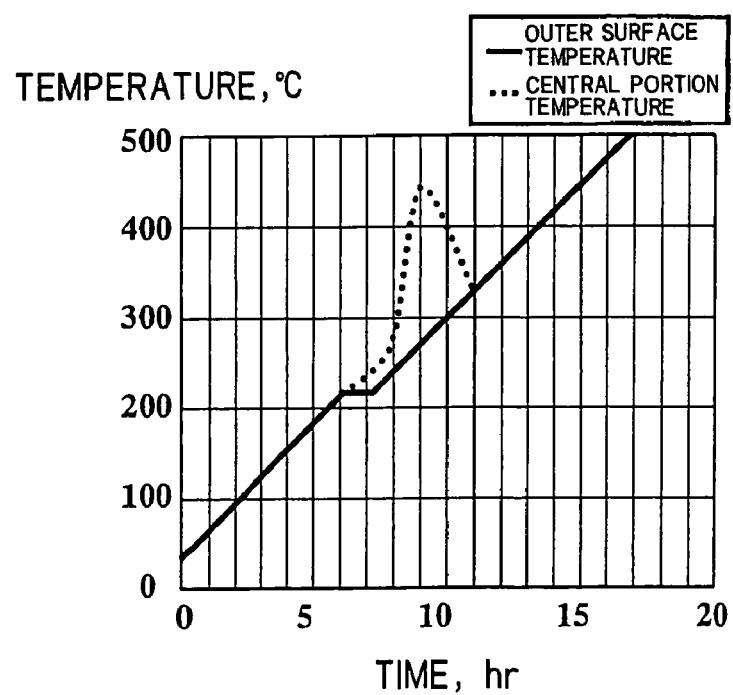
FIG. 10 is a graph showing the temperature of the central portion of the formed structure and the temperature (firing atmosphere temperature) of the outer peripheral portion of the formed structure in the firing step in Comparative Example 4.

Finally, temperature of a firing atmosphere was raised from room temperature to 170° C. lower than the combustion start temperature of hydroxypropyl methyl cellulose at 220° C. by 50° C. at a speed of 30° C./hr. Thereafter, the firing atmosphere temperature was held to be constant for five hours until hydroxypropyl methyl cellulose was completely burnt out, and the temperature of the firing atmosphere was raised at 400° C. at a speed of 30° C./hr. Thereafter, the firing atmosphere was changed to Ar, and the formed structure was fired according to a temperature raising program wherein the firing atmosphere temperature is raised at 1450° C. By the obtained ceramic honeycomb structure, a honeycomb filter was manufactured having a size: φ150 mm×L150 mm, a partition wall thickness: 300 μm, a cell number: 46.5 cells ×10$^{-2}$/mm$^2$. Manufacturing conditions and evaluation results are shown in Table 1, and changes of the temperature of the central portion of the formed structure, and the temperature (firing atmosphere temperature) of the outer peripheral portion in the firing step are shown in FIG. 3.

EXAMPLES 2 to 4 and COMPARATIVE EXAMPLES 1 to 4

Honeycomb filters were manufactured in the same manner as in Example 1 except that formed structures were fired according to a temperature raising program shown in Table 1 in a firing atmosphere. Manufacturing conditions and evaluation results are shown in Table 1, and changes of the temperature of the central portion of the formed structure and the temperature (firing atmosphere temperature) of the outer peripheral portion in the firing step are shown in FIGS. 4 to 10.

TABLE 1

| | Temperature raising program | | Crack |
|---|---|---|---|
| | Atmosphere temperature held to be constant *1 | Time to hold atmosphere temperature | generation ratio (%) |
| Comparative Example 1 | — (changed at temperature raising speed of 30° C./hr) | | 100 |
| Comparative Example 2 | 160° C. | 5 hrs | 100 |
| Example 1 | 170° C. | 5 hrs | 0 |
| Example 2 | 220° C. | 5 hrs | 0 |
| Example 3 | 230° C. | 5 hrs | 0 |
| Comparative Example 3 | 240° C. | 5 hrs | 100 |
| Example 4 | 220° C. | 10 hrs | 0 |
| Comparative Example 4 | 220° C. | 1 hr | 100 |

*1: In the table, the atmosphere temperature was changed at a temperature raising speed of 30° C./hr before/after the temperature was held at a certain temperature.

(Evaluation)

As shown in Table 1 and FIGS. 3 to 10, in manufacturing methods of Comparative Examples 1 to 4, an amplitude of the central portion temperature reached 150° C. or more at maximum with respect to the temperature (firing atmosphere temperature) of the outer surface of the formed structure. Any of 100 manufactured honeycomb structures was cracked.

On the other hand, in manufacturing methods of Examples 1 to 4, the amplitude of the central portion temperature reached 100° C. at maximum with respect to the temperature (firing atmosphere temperature) of the outer surface of the formed structure, and was ⅔ or less as compared with the manufacturing method of Comparative Example 1. Moreover, in any one of the manufacturing methods, any of 100 manufactured honeycomb structures produced according to the above-mentioned method was not cracked.

INDUSTRIAL APPLICABILITY

As described above, according to a method of manufacturing a porous ceramic structure of the present invention, even when ceramic structures having not only a low porosity but also a high porosity are manufactured, the porous ceramic structure can be manufactured without causing any cracks by firing, and the effect is remarkable especially in a manufacturing method using a pore former having a low combustion start temperature. The manufacturing method of the present invention is applicable as the method of manufacturing various ceramic structures, and is preferably applicable especially as a method of manufacturing a ceramic honeycomb structure.

The invention claimed is:

1. A method of manufacturing a porous ceramic structure, comprising the steps of: preparing a formed structure using a ceramic material containing a pore former and a binder; and drying and firing the formed structure,
   wherein the process of firing the formed structure comprises the steps of: holding a firing atmosphere temperature in a temperature range of −50 to +10° C. with respect to a combustion start temperature of the binder from time when the temperature reaches the combustion start temperature of the binder contained in the porous ceramic structure to be fired to time when the binder is burnt out.

2. The method of manufacturing the porous ceramic structure according to claim 1, wherein the firing atmosphere temperature is held in a temperature range of −50 to +10° C. with respect to the combustion start temperature of the binder from time when the temperature reaches a temperature lower than the combustion start temperature of the binder by 50° C. to time when the binder is burnt out.

3. The method of manufacturing the porous ceramic structure according to claim 1, wherein the binder comprises at least one type selected from a group consisting of hydroxypropyl methyl cellulose, methyl cellulose, hydroxyethyl cellulose, carboxyl methyl cellulose, and polyvinyl alcohol.

4. The method of manufacturing the porous ceramic structure according to claim 1, wherein the pore former comprises at least one type selected from a group consisting of flour, starch, phenol resin, foam resin, foamed foam resin, polymethyl methacrylate, and polyethylene terephthalate.

5. The method of manufacturing the porous ceramic structure according to claim 1, wherein the porous ceramic structure is a honeycomb structure.

\* \* \* \* \*